United States Patent
Yang et al.

(10) Patent No.: US 12,398,290 B2
(45) Date of Patent: *Aug. 26, 2025

(54) METHOD FOR MANUFACTURING HEAT SEALABLE POLYESTER FILM

(71) Applicant: NAN YA PLASTICS CORPORATION, Taipei (TW)

(72) Inventors: Wen-Cheng Yang, Taipei (TW); Te-Chao Liao, Taipei (TW); Chia-Yen Hsiao, Taipei (TW); Ching-Yao Yuan, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 28 days.

This patent is subject to a terminal disclaimer.

(21) Appl. No.: 18/121,668

(22) Filed: Mar. 15, 2023

(65) Prior Publication Data

US 2023/0220235 A1 Jul. 13, 2023

Related U.S. Application Data

(62) Division of application No. 17/201,204, filed on Mar. 15, 2021, now Pat. No. 11,958,985.

(30) Foreign Application Priority Data

Jul. 15, 2020 (TW) .................. 109123834

(51) Int. Cl.
*C09D 167/02* (2006.01)
*B29C 48/00* (2019.01)
(Continued)

(52) U.S. Cl.
CPC .......... *C09D 167/02* (2013.01); *B29C 48/022* (2019.02); *B29C 48/08* (2019.02);
(Continued)

(58) Field of Classification Search
CPC ... B29B 17/0042; B29C 48/022; B29C 48/08; B29C 48/21; B29K 2067/003;
(Continued)

(56) References Cited

U.S. PATENT DOCUMENTS

2004/0130059 A1* 7/2004 Kern .................... C08J 5/18
264/235.8
2006/0008638 A1 1/2006 Kiehne et al.
(Continued)

FOREIGN PATENT DOCUMENTS

AU 655531 B2 12/1994
CN 1753930 A 3/2006
(Continued)

OTHER PUBLICATIONS

Machine translation of JP 2007-169424, Taneda, Jul. 5, 2007 (Year: 2007).*

(Continued)

*Primary Examiner* — Alicia Bland
(74) *Attorney, Agent, or Firm* — Li & Cai Intellectual Property (USA) Office

(57) ABSTRACT

A method for manufacturing a heat sealable polyester film is provided. A part of a recycled polyester material is physically reproduced to obtain physically regenerated polyester chips. Another part of a recycled polyester material is chemically reproduced to obtain chemically regenerated polyester chips. Modified polyester chips, the physically regenerated polyester chips and the chemically regenerated polyester chips are mixed to form a raw material mixture, and the modified polyester chips are formed from the recycled polyester material. The raw material mixture is used to form a heat sealable layer. A base layer is disposed onto the heat sealable layer so as to obtain the heat sealable
(Continued)

polyester film. A heat sealing temperature of the heat sealable polyester film ranges from 120° C. to 230° C.

7 Claims, 2 Drawing Sheets

(51) Int. Cl.
*B29C 48/08* (2019.01)
*C08J 11/06* (2006.01)
*C08J 11/10* (2006.01)
*B29K 67/00* (2006.01)
*B29K 105/26* (2006.01)
*B29L 7/00* (2006.01)

(52) U.S. Cl.
CPC ............... *C08J 11/06* (2013.01); *C08J 11/10* (2013.01); *B29K 2067/003* (2013.01); *B29K 2067/006* (2013.01); *B29K 2105/26* (2013.01); *B29L 2007/00* (2013.01); *C08J 2367/02* (2013.01); *C08J 2467/02* (2013.01)

(58) Field of Classification Search
CPC .......... B29K 2105/26; B29K 2067/006; B32B 2250/02; B32B 2250/03; B32B 2250/244; B32B 2250/40; B32B 2255/10; B32B 2255/26; B32B 2264/06; B32B 2270/00; B32B 2272/00; B32B 2307/31; B32B 2307/4023; B32B 2307/718; B32B 2307/732; B32B 2307/75; B32B 2439/60; B32B 27/08; B32B 27/16; B32B 27/18; B32B 27/36; B32B 7/02; B32B 7/027; C08G 63/183; C08J 11/04; C08J 11/06; C08J 11/10; C08J 2300/30; C08J 2367/02; C08J 2467/02; C09D 167/02; Y02P 20/143; Y02W 30/62; B29L 2007/00

See application file for complete search history.

(56) References Cited

U.S. PATENT DOCUMENTS

| | | | |
|---|---|---|---|
| 2009/0082496 A1 | 3/2009 | Tammaji et al. | |
| 2014/0288209 A1* | 9/2014 | Jung | G02B 1/04 524/605 |
| 2020/0391133 A1* | 12/2020 | Mikkelsen | B29C 45/0001 |
| 2021/0331846 A1 | 10/2021 | Lin et al. | |
| 2022/0017769 A1 | 1/2022 | Yang et al. | |

FOREIGN PATENT DOCUMENTS

| | | | |
|---|---|---|---|
| CN | 101367285 A | | 2/2009 |
| CN | 101456809 B | | 8/2012 |
| JP | 532800 A | | 2/1993 |
| JP | 5222275 A | | 8/1993 |
| JP | 939175 A | | 2/1997 |
| JP | 3320820 B2 | | 9/2002 |
| JP | 2006305975 A | | 11/2006 |
| JP | 2007160933 A | | 6/2007 |
| JP | 2007169424 A | * | 7/2007 |
| JP | 2011256328 A | | 12/2011 |
| JP | 2015101057 A | | 6/2015 |
| JP | 2015108081 A | | 6/2015 |
| JP | 2017214577 A | | 12/2017 |
| JP | 2018168381 A | | 11/2018 |
| JP | 6674594 B2 | | 4/2020 |
| JP | 202219520 A | | 1/2022 |
| TW | M598286 U | | 7/2020 |

OTHER PUBLICATIONS

Machine translation of JP 2011-256328; Nakamachi, Dec. 22, 2011 (Year: 2011).*

Osuka Hiroshi; "New Food Packaging Film—Flexible Packaging and Environment"; Daily Publication; Apr. 18, 1994 (Apr. 18, 1994); pp. 142-147.

* cited by examiner

METHOD FOR MANUFACTURING HEAT SEALABLE POLYESTER FILM

CROSS-REFERENCE TO RELATED PATENT APPLICATION

This application is a divisional application of the U.S. application Ser. No. 17/201,204, filed on Mar. 15, 2021, and entitled "HEAT SEALABLE POLYESTER FILM AND METHOD FOR MANUFACTURING THE SAME," now pending, the entire disclosures of which are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for manufacturing a heat sealable polyester film, and more particularly to a method for manufacturing the heat sealable polyester film by using a recycled polyester material.

BACKGROUND OF THE DISCLOSURE

In recent years, usage of plastics has increased significantly, and as a result, a large amount of plastic waste is produced. Since the plastics are not easily degraded, recycling of the plastics and how to process the plastics after recycling have become particularly important issues.

Polyethylene terephthalate (PET) makes up a major portion of recycled plastics, and recycled PET plastics takes up about 52.4% of a total amount of the recycled plastics. In order to deal with such a large amount of recycled PET plastics, researchers in relevant field have to dedicate themselves to developing a method for processing the recycled PET plastics.

Out of the current techniques, the most common method to regenerate PET is through a physical (mechanical) manner. The recycled PET plastics that have been washed clean are firstly shredded to pieces and melted under high temperature, and then are extruded by an extruder to produce regenerated PET chips (also called as r-PET).

To address environmental concerns and to ensure that PET products contain more eco-friendly regenerated PET chips, a large amount of high-quality recycled PET chips is required. In the current industry, the PET recycling is mostly carried out by way of physical recycling. However, functional components (such as a slipping agent and an electrostatic pinning additive) are not allowed to be added, during a manufacturing process, to recycle chips that are produced through physical recycling. Therefore, it is necessary to use additional virgin (not regenerated) PET chips for additionally adding the above-mentioned functional components.

However, after adding the virgin PET chips, a usage rate of the regenerated PET chips contained in the PET products will decrease. That is to say, in the current techniques, it is not possible to fully utilize the regenerated PET chips to manufacture new PET products. If the usage rate of the regenerated PET chips is too low, it may not be possible to satisfy a standard set up by environmental regulations such that an eco-label can be obtained. Moreover, as virgin PET chips that are newly used in the process of manufacturing the PET products would subsequently become the regenerated PET plastics that require processing, a problem of recycling and reusing would still arise.

SUMMARY OF THE DISCLOSURE

In response to the above-referenced technical inadequacies, the present disclosure provides a heat sealable polyester film and a method for manufacturing the same.

In one aspect, the present disclosure provides a heat sealable polyester film. The heat sealable polyester film is formed from a recycled polyester material. The heat sealable polyester film includes a base layer and a heat sealable layer. The heat sealable layer is disposed on at least one surface of the base layer. The heat sealable layer is formed from a first polyester composition. The first polyester composition includes regenerated polyethylene terephthalate as a main component, and the first polyester composition further includes at least one of 1,4-butanediol, isophthalic acid, neopentyl glycol, and polybutylene terephthalate. A heat sealing temperature of the heat sealable polyester film ranges from 120° C. to 230° C.

In certain embodiments, the first polyester composition includes a physically regenerated polyester resin and a chemically regenerated polyester resin. A main component of each of the physically regenerated polyester resin and the chemically regenerated polyester resin is regenerated polyethylene terephthalate. Based on a total weight of the first polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

In certain embodiments, the chemically regenerated polyester resin is formed from chemically regenerated polyester chips. The chemically regenerated polyester chips include chemically regenerated regular polyester chips, chemically regenerated electrostatic pinning polyester chips, and chemically regenerated modified polyester chips. The chemically regenerated modified polyester chips include regenerated polyethylene terephthalate as a main component, and the chemically regenerated modified polyester chips further includes residue of at least one of 1,4-butanediol, isophthalic acid, and neopentyl glycol. Based on a total weight of the chemically regenerated modified polyester chips being 100 wt %, the chemically regenerated modified polyester chips include 0 wt % to 30 wt % of 1,4-butanediol residue, 0 wt % to 30 wt % of isophthalic acid residue, and 0 wt % to 30 wt % of neopentyl glycol residue.

In certain embodiments, the physically regenerated polyester resin is formed from physically regenerated polyester chips. The physically regenerated polyester chips include physically regenerated regular polyester chips and physically regenerated modified polyester chips. The physically regenerated modified polyester chips include regenerated polyethylene terephthalate as a main component, and the physically regenerated modified polyester chips further include polybutylene terephthalate. Based on a total weight of the physically regenerated modified polyester chips being 100 wt %, the physically regenerated modified polyester chips include larger than 0 wt % to 30 wt % of polybutylene terephthalate.

In certain embodiments, a concentration of cyclic oligomer in the physically regenerated polyester resin is lower than a concentration of cyclic oligomer in the chemically regenerated polyester resin.

In certain embodiments, a thickness ratio of the heat sealable layer to the heat sealable polyester film ranges from 3% to 30%. A thickness of the heat sealable polyester film ranges from 4 µm to 100 µm. A thickness of the heat sealable layer ranges from 0.5 µm to 10 µm.

In certain embodiments, based on a total weight of the first polyester composition being 100 wt %, the first polyester composition contains 0.5 wt % to 5 wt % of isophthalic acid.

In certain embodiments, based on a total weight of the first polyester composition being 100 wt %, the first polyester composition contains 1 wt % to 25 wt % of a biomass-derived material, and a content of C14 among total carbon atoms in the first polyester composition ranges from 0.2 wt % to 5 wt %.

In certain embodiments, based on a total weight of the first polyester composition being 100 wt %, the first polyester composition contains 0.0003 wt % to 0.04 wt % of a metal catalyst. The metal catalyst is selected from the group consisting of antimony, germanium, titanium, and any combination thereof.

In certain embodiments, the base layer is formed from a second polyester composition. A main component of the second polyester composition is regenerated polyethylene terephthalate. The second polyester composition includes a physically regenerated polyester resin and a chemically regenerated polyester resin. A main component of each of the physically regenerated polyester resin and the chemically regenerated polyester resin is regenerated polyethylene terephthalate. Based on a total weight of the second polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

In another aspect, the present disclosure provides a method for manufacturing the heat sealable polyester film. The method for manufacturing the heat sealable polyester film includes the following steps. A part of a recycled polyester material is physically reproduced to obtain physically regenerated polyester chips. The physically regenerated polyester chips include physically regenerated regular polyester chips. Another part of the recycled polyester material is chemically reproduced to obtain chemically regenerated polyester chips. The chemically regenerated polyester chips include chemically regenerated regular polyester chips and chemically regenerated electrostatic pinning polyester chips. Modified polyester chips are mixed with the physically regenerated polyester chips and the chemically regenerated polyester chips to form a raw material mixture. The modified polyester chips are formed from the recycled polyester material. The modified polyester chips include regenerated polyethylene terephthalate as a main component, and the modified polyester chips further include at least one of 1,4-butanediol, isophthalic acid, neopentyl glycol, and polybutylene terephthalate. The raw material mixture is used to form a heat sealable layer. A base layer is disposed onto the heat sealable layer so as to obtain a heat sealable polyester film. A heat sealing temperature of the heat sealable polyester film ranges from 120° C. to 230° C.

In certain embodiments, the modified polyester chips are selected form the group consisting of: chemically regenerated modified polyester chips, physically regenerated modified polyester chips, and a mixture thereof.

In certain embodiments, the chemically regenerated modified polyester chips are prepared by the following steps. The recycled polyester material is depolymerized to obtain a first oligomer mixture. At least one of 1,4-butanediol, isophthalic acid, and neopentyl glycol is added into the first oligomer mixture to form a second oligomer mixture. The second oligomer mixture is repolymerized to obtain the chemically regenerated modified polyester chips. The chemically regenerated modified polyester chips include regenerated polyethylene terephthalate as a main component, and the chemically regenerated modified polyester chips further includes residue of at least one of 1,4-butandiol, isophthalic acid, and neopentyl glycol.

In certain embodiments, the physically regenerated modified polyester chips are prepared by the following steps. The recycled polyester material is melted to obtain a first melted mixture. Polybutylene terephthalate is added into the first melted mixture to form a second melted mixture. The second melted mixture is molded to obtain the physically regenerated modified polyester chips. The physically regenerated modified polyester chips include regenerated polyethylene terephthalate as a main component, and the physically regenerated modified polyester chips further include polybutylene terephthalate.

In yet another aspect, the present disclosure provides a method for manufacturing a heat sealable polyester film. The method for manufacturing a heat sealable polyester film includes the following steps. A part of a recycled polyester material is physically reproduced to obtain physically regenerated polyester chips. The physically regenerated polyester chips include physically regenerated regular polyester chips. Another part of the recycled polyester material is chemically reproduced to obtain chemically regenerated polyester chips. The chemically regenerated polyester chips include chemically regenerated regular polyester chips and chemically regenerated electrostatic pinning polyester chips. Modified polyester chips are mixed with the physically regenerated polyester chips and the chemically regenerated polyester chips, so as to form a raw material mixture. The modified polyester chips are formed from the recycled polyester material. The modified polyester chips include regenerated polyethylene terephthalate as a main component, and the modified polyester chips further include at least one of 1,4-butanediol, isophthalic acid, neopentyl glycol, and polybutylene terephthalate. The physically regenerated polyester chips and the chemically regenerated polyester chips are mixed to form a base material. The raw material mixture and the base material are co-extruded so as to form a heat sealable polyester film. The heat sealable polyester film includes a heat sealable layer formed from the raw material mixture and a base layer formed from the base material. A heat sealing temperature of the heat sealable polyester film ranges from 120° C. to 230° C.

Therefore, by virtue of "a main component of the first polyester composition being regenerated polyethylene terephthalate" and "the first polyester composition including at least one of: 1,4-butanediol, isophthalic acid, neopentyl glycol, and polybutylene terephthalate", an amount of the recycled polyester material in the heat sealable polyester film can be increased.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
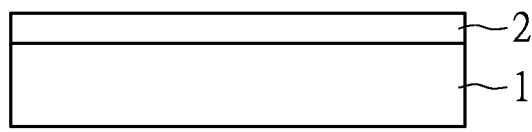
FIG. 1 is a side schematic view of a heat sealable polyester film according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a first embodiment of the present disclosure provides a heat sealable polyester film Z. The heat sealable polyester film Z includes a base layer 1 and a heat sealable layer 2. The heat sealable layer 2 is formed on one surface of the base layer 1. Generally, a melting point of the heat sealable layer 2 is lower than a melting point of the base layer 1. Therefore, after two layers of the heat sealable polyester film Z are overlapped and then heat-pressed, the heat sealable layers 2 with lower melting points can be melted and attached with each other.

In the present embodiment, a thickness of the heat sealable polyester film Z ranges from 4 µm to 100 µm. A thickness of the heat sealable layer 2 ranges from 0.5 µm to 10 µm. A thickness ratio of the heat sealable layer 2 to the heat sealable polyester film Z ranges from 3% to 30%.

The base layer 1 is formed from a polyester composition. A main component of the polyester composition is regenerated polyethylene terephthalate. The polyester composition includes a physically regenerated polyester resin and a chemically regenerated polyester resin. A main component of each of the physically regenerated polyester resin and the chemically regenerated polyester resin is regenerated polyethylene terephthalate.

In the polyester composition forming the base layer 1, based on a total weight of the polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

The heat sealable layer 2 is formed from a polyester composition. A main component of the polyester composition is regenerated polyethylene terephthalate. The polyester composition includes a physically regenerated polyester resin and a chemically regenerated polyester resin. A main component of each of the physically regenerated polyester resin and the chemically regenerated polyester resin is regenerated polyethylene terephthalate.

In the polyester composition forming the heat sealable layer 2, based on a total weight of the polyester composition being 100 wt %, a content of the physically regenerated polyester resin ranges from 50 wt % to 95 wt %, a content of the chemically regenerated polyester resin ranges from 1 wt % to 40 wt %, and a total content of the physically regenerated polyester resin and the chemically regenerated polyester resin ranges from 50 wt % to 100 wt %.

The polyester composition forming the heat sealable layer 2 includes a modified agent. The modified agent includes at least one of 1,4-butandiol, isophthalic acid, neopentyl glycol and polybutylene terephthalate. The addition of the modified agent can decrease a melting point of the heat sealable layer 2, so that the heat sealing temperature of the heat sealable polyester film Z ranges from 120° C. to 230° C.

Accordingly, the base layer 1 and the heat sealable layer 2 are formed from a polyester composition. The polyester composition includes the physically regenerated polyester resin and the chemically regenerated polyester resin. The polyester composition forming the base layer 1 and the polyester composition forming the heat sealable layer 2 can be the same or different.

The usage ratio of the recycled polyester material of the base layer 1 and the heat sealable layer 2 in the present disclosure can be increased by mixing the physically regenerated polyester resin and the chemically regenerated polyester resin. Compared to the conventional method by additionally adding virgin PET aggregate, the method of the present disclosure is more environment-friendly and can overcome the problem of high impurity caused by only using physically regenerated polyester resin.

Further, the aforementioned physically regenerated polyester resin is formed from one or many kinds of physically regenerated polyester chips. A main component of the physically regenerated polyester chips is regenerated polyethylene terephthalate. The aforementioned chemically regenerated polyester resin is formed from one or many kinds of chemically regenerated polyester chips. A main component of the chemically regenerated polyester chips is regenerated polyethylene terephthalate. The specific preparations of the physically regenerated polyester chips and the chemically regenerated polyester chips are illustrated later.

Figure 4:
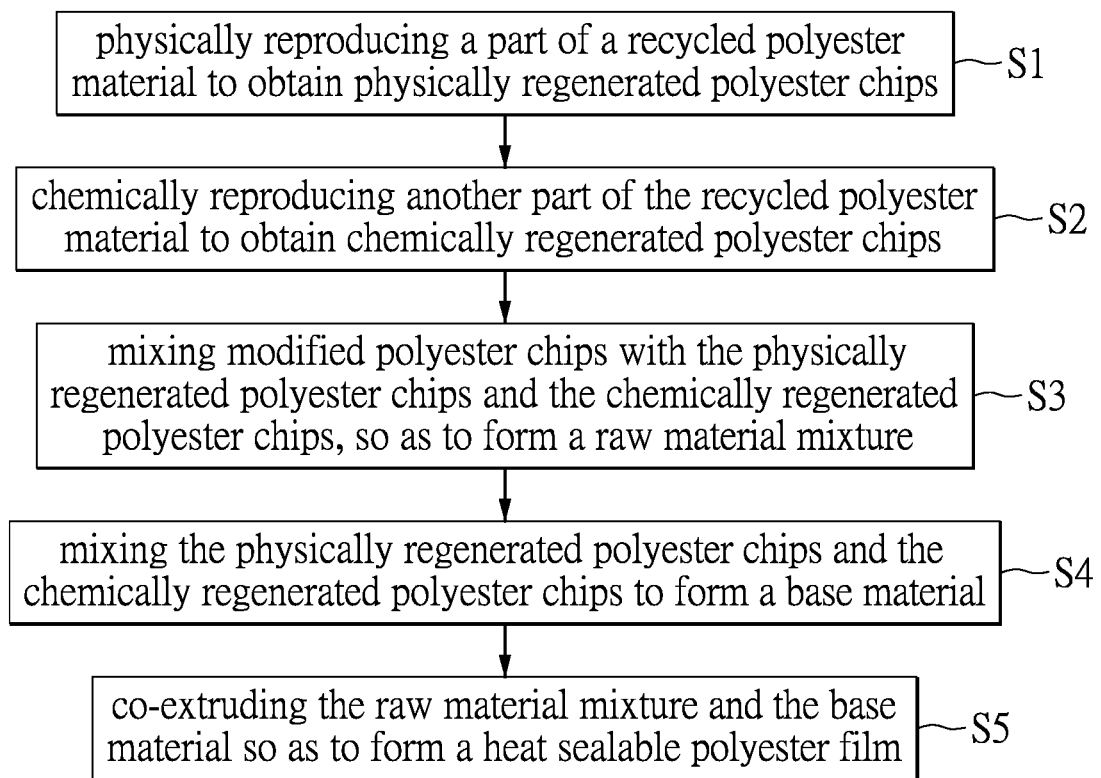
FIG. 4 is a flowchart describing a method for manufacturing the heat sealable polyester film of the present disclosure.

Referring to FIG. 4, a method for manufacturing the heat sealable polyester film of the present disclosure includes the following steps. A part of the recycled polyester material is physically reproduced to obtain physically regenerated polyester chips having a main component of regenerated polyethylene terephthalate (step S1). Another part of the recycled polyester material is chemically reproduced to obtain chemically regenerated polyester chips having a main component of regenerated polyethylene terephthalate (step S2). Modified polyester chips formed from the recycled polyester material are mixed with the physically regenerated polyester chips and the chemically regenerated polyester chips, so as to form a raw material mixture. The Modified polyester chips are formed from the recycled polyester material. A main component of the modified polyester chips is regenerated polyethylene terephthalate (step S3). The physically regenerated polyester chips and the chemically regenerated polyester chips are mixed to form a base material (step S4). The raw material mixture and the base material are co-extruded to obtain the heat sealable polyester film (step S5).

In step S1, a physical reproduction process includes the following steps. The recycled polyester material (such as bottle chips) is cut into pieces, and then melted to form a melted mixture. The melted mixture is extruded by a single-screw extruder or a twin-screw extruder and then granulated to obtain the physically regenerated polyester chips.

In the present embodiment, the physically regenerated polyester chips include physically regenerated regular polyester chips. The physically regenerated regular polyester chips are polyester chips prepared through the physical reproduction process and no additive is added during the physical reproduction process. In the present embodiment, components to form the physically regenerated regular polyester chips include regenerated polyethylene terephthalate.

In addition, in the physical reproduction process, functional additives (such as slipping agents, coloring agents, or matting agents) can be added in the melted mixture, so as to prepare the physically regenerated polyester chips with different functions.

For example, the slipping agents can be, but is not limited to: silicon dioxide, polystyrene, polymethylmethacrylate, silicone rubber, acrylic, or any combination thereof. A particle size of the slipping agents is smaller than 2 μm. In the present embodiment, the slipping agents are sphere-shaped, so that the slipping agents can have better transparency. The physically regenerated slipping polyester chips can be prepared by adding the slipping agents into the melted mixture. In the present embodiment, components of the physically regenerated slipping polyester chips include regenerated polyethylene terephthalate and slipping agents.

For example, the coloring agents can be, but are not limited to: coloring additives, carbon black, titanium dioxide, barium sulfate, or calcium carbonate. The physically regenerated color polyester chips can be prepared by adding the coloring agents into the melted mixture. In the present embodiment, components of the physically regenerated color polyester chips include regenerated polyethylene terephthalate and coloring agents.

For example, the matting agents can be, but is not limited to: silicon dioxide, organics, silicon rubber, acrylic, or any combination. The physically regenerated matting polyester chips can be prepared by adding the matting agents into the melted mixture. In the present embodiment, components of the physically regenerated matting polyester chips include regenerated polyethylene terephthalate and matting agents.

In step S2, a chemical reproduction process includes the following steps. The recycled polyester material (such as bottle chips) is cut into pieces, and then put in a chemical depolymerizing solution. Molecules of polyester are depolymerized into polyester monomers composed of a diacid unit and two diol units (such as bis(2-hydroxyethyl) terephthalate (BHET)) or oligomers, such that an oligomer mixture is formed. Subsequently, the oligomer mixture is isolated, purified, repolymerized, and then granulated to obtain the chemically regenerated polyester chips. In the present embodiment, a main component of the chemically regenerated polyester chips is regenerated polyethylene terephthalate.

In the present embodiment, the chemical depolymerizing solution can be water, methanol, ethanol, ethylene glycol, diethylene glycol or any combination thereof. However, the present embodiment is not limited thereto. For example, the water is used for hydrolysis, and methanol, ethanol, ethylene glycol, diethylene glycol are used for alcoholysis. In a preferable embodiment, the chemical depolymerizing solution includes ethylene glycol.

In the present embodiment, the chemically regenerated polyester chips can be classified into the chemically regenerated regular polyester chips and the chemically regenerated electrostatic pinning polyester chips. The term "chemically regenerated regular polyester chips" refers to polyester chips prepared through the chemical reproduction process and no functional additive is added during the chemical reproduction process. In the present embodiment, a main component of the chemically regenerated regular polyester chips is regenerated polyethylene terephthalate. The term "chemically regenerated electrostatic pinning polyester chips" is prepared by adding electrostatic pinning additives into the oligomer mixture, and then repolymerizing the oligomer mixture. In the present embodiment, components to form the chemically regenerated electrostatic pinning polyester chips include regenerated polyethylene terephthalate and the electrostatic pinning agent.

It should be noted that, the term "electrostatic pinning" refers to a use of materials that increase electrical conductivity or decreases electrical resistivity. The term "electrostatic pinning agent" in the present disclosure refers to materials that increase electrical conductivity or decrease electrical resistivity.

The electrostatic pinning additives are metal salts. The metal salt can be sodium hydroxide, potassium hydroxide, or metal salts containing aliphatic carboxylic acid. In the metal salts containing aliphatic carboxylic acid, a carbon number of the aliphatic carboxylic acid ranges from 2 to 30. For instance, the aliphatic carboxylic acid (in the form of metal salts) contains monocarboxylic acid and dicarboxylic acid, such as acetic acid, palmitic acid, stearic acid, oleic acid or sebacic acid. In the present embodiment, the aliphatic carboxylic acid is preferably acetic acid. Further, a metal component of the metal salts can be, for example, alkali metal or alkaline earth metal. In other words, the metal salts can be, for example, lithium salts, sodium salts, potassium salts, manganese salts, zinc salts, calcium salts, magnesium salts, or aluminum salts. In the present embodiment, the metal salts are preferably manganese salts or lithium salts. The manganese salts can be magnesium acetate (Mg (CH3COO)2), and the lithium salts can be lithium acetate (CH3COOLi). However, the present disclosure is not limited thereto.

In addition, in the chemical reproduction process, the functional additives mentioned above (such as slipping agent, coloring agent, and matting agent) can be added into the oligomer mixture. Accordingly, after repolymerizing the oligomer mixture, the chemically regenerated polyester chips with different functions can be obtained.

In step S3, the raw material mixture can be used to form the heat sealable layer 2. The modified polyester chips can be prepared from the recycled polyester material by the physical reproduction process or by the chemical reproduction process. The modified polyester chips include chemically regenerated modified polyester chips, physically regenerated modified polyester chips, or a mixture thereof. A main component of the modified polyester chips is regenerated polyethylene terephthalate. In addition, the modified polyester chips further include at least one of 1,4-butandiol, isophthalic acid, neopentyl glycol, and polybutylene terephthalate. Therefore, by means of adding the modified polyester chips, the polyester composition that forms the heat sealable layer 2 includes at least one of 1,4-butandiol, isophthalic acid, neopentyl glycol, and polybutylene terephthalate.

Specifically, the physically regenerated polyester chips are prepared by steps below. The recycled polyester material is melted to obtain a first melted mixture. Polybutylene terephthalate is added into the first melted mixture to form a second melted mixture. The second melted mixture is molded to obtain the physically regenerated modified polyester chips having a main component of regenerated polyethylene terephthalate. The physically regenerated modified polyester chips further include polybutylene terephthalate. Based on a total weight of the physically regenerated modified polyester chips being 100 wt %, a content of polybutylene terephthalate ranges from larger than 0 wt % to 30 wt %.

Specifically, the chemically regenerated polyester chips are prepared by the following steps. The recycled polyester material is depolymerized to obtain a first oligomer mixture. At least one of 1,4-butandiol, isophthalic acid, and neopentyl glycol is added into the first oligomer mixture to form a second oligomer mixture. The second oligomer mixture is repolymerized to obtain the chemically regenerated polyester chips having a main component of regenerated polyethylene terephthalate. The chemically regenerated modified polyester chips further include residue of at least one of 1,4-butandiol, isophthalic acid, and neopentyl glycol. Based on a total weight of the chemically regenerated modified polyester chips being 100 wt %, a content of 1,4-butandiol residue ranges from 0 wt % to 30 wt %, a content of isophthalic acid residue ranges from 0 wt % to 30 wt %, and a content of neopentyl glycol residue ranges from 0 wt % to 30 wt %.

In the present disclosure, the term "residue" refers to a group or a unit derived from a specific compound in a chemical reaction. For example, "a residue of a dibasic acid component" is a group derived from the dibasic acid component after an esterification reaction or a polycondensation reaction in a polyester or a copolyester, and "a residue of a diol component" is a group derived from the diol component after an esterification reaction or a polycondensation reaction in a polyester or a copolyester.

In step S4, the physically regenerated polyester chips prepared in step S1 and the chemically regenerated polyester chips prepared in step S2 are mixed to form a base material.

The base material can be used to form the base layer 1. Therefore, the heat sealable polyester film Z can contain high usage ratio of the recycled polyester material. In other embodiments, the base layer 1 can be other commercially available polyester material.

In step S5, the raw material mixture prepared in step S3 and the base material prepared in step S4 are co-extruded to form the heat sealable polyester film Z. The heat sealable polyester film Z includes the heat sealable layer 2 formed from the raw material mixture and the base layer 1 formed from the base material. In other embodiments, the heat sealable layer 2 and the base layer 1 can be formed respectively before the heat sealable layer 2 is disposed on the base layer 1, and not limited to being co-extruded.

In the present embodiment, the recycled polyester material is recycled bottle chips. A main material of the recycled bottle chips is polyester. Generally, polyester is formed by a polycondensation of diol units and diacid units. For recycled bottle chips, the diol units can be ethylene glycol derived from petroleum or ethylene glycol derived from biomass. As for the polyester compositions forming the base layer 1 and the heat sealable layer 2, based on the total weight of the polyester composition being 100 wt %, the polyester composition includes 1 wt % to 25 wt % of a biomass-derived material. In other words, a content of C14 among total carbon atoms in the polyester composition ranges from 0.2 wt % to 5 wt %.

The recycled polyester material can include isophthalic acid. Therefore, the polyester composition may also contain isophthalic acid. Based on the total weight of the polyester composition being 100 wt %, the polyester composition contains 0.5 wt % to 5 wt % of isophthalic acid.

The recycled polyester material can include a metal catalyst. Therefore, the polyester composition may also contain the metal catalyst. Based on the total weight of the polyester composition being 100 wt %, the polyester composition contains 0.0003 wt % to 0.04 wt % of the metal catalyst. The metal catalyst is selected from the group consisting of antimony, germanium, titanium, and any combination thereof.

Second Embodiment

Figure 2:
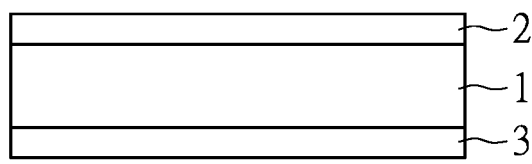
FIG. 2 is a side schematic view of the heat sealable polyester film according to a second embodiment of the present disclosure.

Referring to FIG. 2, a second embodiment of the present disclosure provides a heat sealable polyester film Z. The heat sealable polyester film Z includes a base layer 1 and two heat sealable layers 2 and 3. The heat sealable layers 2 and 3 are respectively disposed on two surfaces of the base layer 1. A material of the base layer 1 and materials of the heat sealable layers 2 and 3 in the second embodiment are similar to the material of the base layer 1 and the material of the heat sealable layer 2 in the first embodiment, respectively. Therefore, the specific content is not repeated herein.

Third Embodiment

Figure 3:
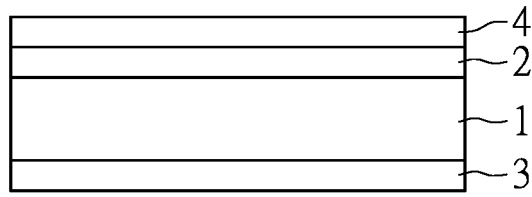
FIG. 3 is a side schematic view of the heat sealable polyester film according to a third embodiment of the present disclosure.

Referring to FIG. 3, a third embodiment of the present disclosure provides a heat sealable polyester film Z. The heat sealable polyester film Z includes a base layer 1, two heat sealable layers 2 and 3, and a printable layer 4. The heat sealable layers 2 and 3 are respectively disposed on two surfaces of the base layer 1. The printable layer 4 is disposed on the heat sealable layer 2. A material of the base layer 1 and materials of the heat sealable layers 2 and 3 in the third embodiment are similar to the material of the base layer 1 and the material of the heat sealable layer 2 in the first embodiment, respectively. Therefore, the specific content is not repeated herein.

The printable layer 4 is formed from a hardener, and at least one of a waterborne polyester resin, a waterborne polyurethane resin, and a waterborne acrylic resin. Further, a surface of the printable layer 4 can undergo a corona treatment so as to achieve effects of good ink absorbency and good printing quality.

Beneficial Effects of the Embodiments

In conclusion, the heat sealable polyester film Z and the method for manufacturing the heat sealable polyester film Z are provided in the present disclosure, and by virtue of "a main component of the first polyester composition being regenerated polyethylene terephthalate" and "the first polyester composition including at least one of: 1,4-butanediol, isophthalic acid, neopentyl glycol, and polybutylene terephthalate", an amount of the recycled polyester material in the heat sealable polyester film Z can be increased.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a heat sealable polyester film, comprising:
    physically recycling a part of a recycled polyester material to obtain physically regenerated polyester chips, wherein a process of the physically recycling the part of the recycled polyester material includes:
        melting the part of the recycled polyester material to obtain a melt,
        adding polybutylene terephthalate into the melt, and
        molding the melt containing the polybutylene terephthalate to obtain the physically regenerated polyester chips,
    wherein based on a total weight of the physically regenerated polyester chips being 100 wt %, the physically regenerated polyester chips include larger than 0 wt % to 30 wt % of the polybutylene terephthalate;
    chemically recycling another part of the recycled polyester material to obtain chemically regenerated polyester chips, wherein the chemically regenerated polyester chips include chemically regenerated regular polyester chips and chemically regenerated electrostatic pinning polyester chips;
    mixing modified polyester chips with the physically regenerated polyester chips and the chemically regenerated polyester chips to form a raw material mixture, wherein the modified polyester chips are formed from the recycled polyester material, and the modified polyester chips include regenerated polyethylene terephthalate,
    wherein the modified polyester chips further include at least one of 1,4-butanediol, isophthalic acid, neopentyl glycol, and polybutylene terephthalate;
    using the raw material mixture to form a heat sealable layer; and
    disposing a base layer onto the heat sealable layer so as to obtain the heat sealable polyester film;
    wherein a heat sealing temperature of the heat sealable polyester film ranges from 120° C. to 230° C.;
    wherein based on a total weight of the raw material mixture being 100 wt %, a content of the physically regenerated polyester chips ranges from 50 wt % to 95 wt %, a content of the chemically regenerated polyester chips ranges from 1 wt % to 40 wt %.

2. The method according to claim 1, wherein the modified polyester chips are selected from the group consisting of: chemically regenerated modified polyester chips, physically regenerated modified polyester chips, and a mixture thereof.

3. The method according to claim 2, wherein the chemically regenerated modified polyester chips are prepared by steps of:
    depolymerizing the recycled polyester material to obtain a first oligomer mixture;
    adding at least one of: 1,4-butanediol, isophthalic acid, and neopentyl glycol into the first oligomer mixture to form a second oligomer mixture; and
    repolymerizing the second oligomer mixture to obtain the chemically regenerated modified polyester chips;
    wherein the chemically regenerated modified polyester chips include regenerated polyethylene terephthalate as a main component, and the chemically regenerated modified polyester chips further include residue of at least one of 1,4-butanediol, isophthalic acid, and neopentyl glycol.

4. The method according to claim 2, wherein the physically regenerated modified polyester chips are prepared by steps of:
    melting the recycled polyester material to obtain a first melted mixture;
    adding polybutylene terephthalate into the first melted mixture to form a second melted mixture; and
    molding the second melted mixture to obtain the physically regenerated modified polyester chips; wherein the physically regenerated modified polyester chips include regenerated polyethylene terephthalate as a main component, and the physically regenerated modified polyester chips further include polybutylene terephthalate.

5. The method according to claim 2, wherein, based on a total weight of the chemically regenerated modified polyester chips being 100 wt %, the chemically regenerated modified polyester chips include 0 wt % to 30 wt % of 1,4-butanediol residue, 0 wt % to 30 wt % of isophthalic acid residue, and 0 wt % to 30 wt % of neopentyl glycol residue.

6. The method according to claim 1, wherein a concentration of cyclic oligomer in the physically regenerated polyester chips is lower than a concentration of cyclic oligomer in the chemically regenerated polyester chips.

7. The method according to claim 1, wherein a thickness ratio of the heat sealable layer to the heat sealable polyester film ranges from 3% to 30%, a thickness of the heat sealable polyester film ranges from 4 μm to 100 μm, and a thickness of the heat sealable layer ranges from 0.5 μm to 10 μm.

* * * * *